(No Model.)
F. A. DELAND.
ATTACHMENT FOR LAWN MOWERS.
No. 404,690. Patented June 4, 1889.
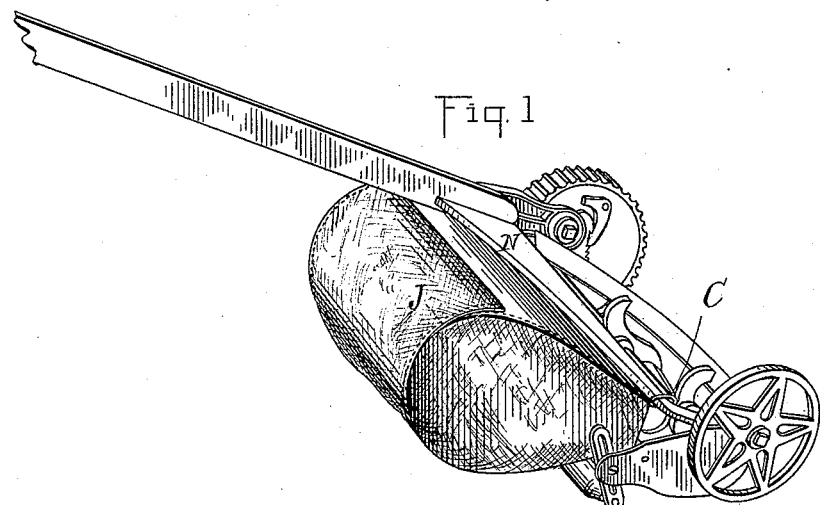
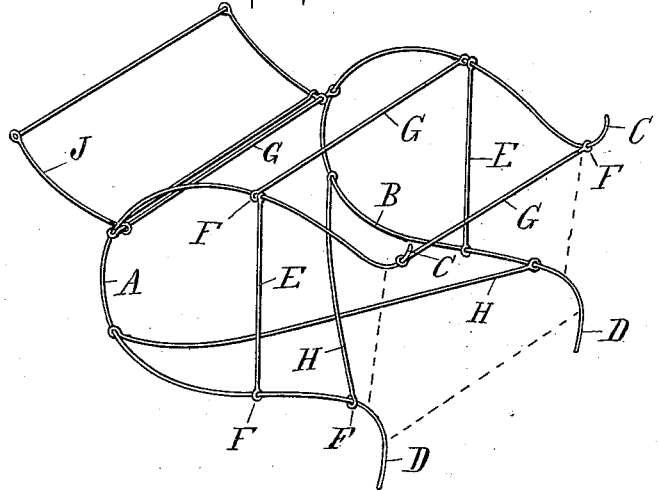
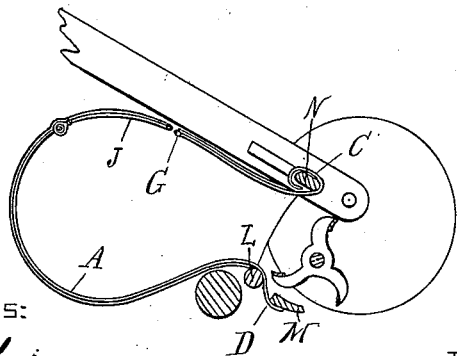
Witnesses:
P. M. Hulbert
J. Paul Mayer
Inventor:
Frank A. Deland
By Thos. S. Sprague & Son
Att'y.

UNITED STATES PATENT OFFICE.

FRANK A. DELAND, OF MEMPHIS, MICHIGAN.

ATTACHMENT FOR LAWN-MOWERS.

SPECIFICATION forming part of Letters Patent No. 404,690, dated June 4, 1889.

Application filed September 26, 1888. Serial No. 286,455. (No model.)

*To all whom it may concern:*

Be it known that I, FRANK A. DELAND, a citizen of the United States, residing at Memphis, in the county of St. Clair and State of Michigan, have invented certain new and useful Improvements in Attachments to Lawn-Mowers, of which the following is a specification, reference being had therein to the accompanying drawings.

This invention relates to a new and useful improvement in an attachment for lawn-mowers; and the invention consists in the peculiar construction of a receptacle adapted to be secured to the ordinary lawn-mowers for the purpose of collecting the grass and other débris thrown off by the lawn-mower in cutting the lawns, all as more fully hereinafter described, and shown in the accompanying drawings, wherein—

Figure 1 is a perspective view showing my device attached to a lawn-mower of known construction. Fig. 2 is a perspective view of the frame of the receptacle detached from the mower, and Fig. 3 is a vertical central cross-section through the lawn-mower and receptacle.

My attachment to lawn-mowers consists of a light and roomy receptacle constructed of a fabric or cloth covered skeleton wire frame in the following manner: A and B form the sides of the frame, each consisting of a single loop of spring-wire contracting toward the opening between the ends C and D, and held in this form by a cross-bar E, substantially connecting the two branches of each loop near the center. The two loops are connected on top by two or more transverse bars G G, and on the bottom by the diagonal bars H H, suitable eyes F being formed on the ends of these bars to connect them with the loops. At the rear end of the frame thus formed is secured the skeleton door-frame J, hinged at its lower end in any suitable manner to the loops, or preferably to one of the stationary transverse bars G, all in such manner that the door may open upwardly and rearwardly, the hinge being on the lower side. This frame and door-frame thus constructed are covered upon the sides, top, and bottom with a light fabric, secured by stitching to the wires, and forming the means of keeping such wires in their proper position.

In practice the receptacle thus constructed can be readily secured to lawn-mowers of any description by merely engaging the free ends D of the loops with the usual transverse bar L and knife-bar M, which are present in most styles of lawn-mowers, and engaging the upper ends C of such loops with the usual bail N on the handle of the lawn-mower.

With the great variety of lawn-mowers in practical use it is a difficult matter to construct a receptacle of this kind which may be as readily secured with one style as with another. This result I obtain by the peculiar construction of the receptacle, which provides for a large degree of adjustability, as it will be seen that the ends of the wires at the mouth of the receptacle may be more or less compressed to permit of securing the receptacle in place immediately behind the revolving cutter. At the same time the spring-wire frame, which tends to open the mouth of the receptacle, holds the device firmly in place without any complicated means of fastening. To provide still further for forming the means for attaching the receptacle to the various styles of lawn-mowers I prefer to manufacture the device with the ends C and D of the loops projecting to a suitable length, so that eyes or hooks of any shape, length, or size may be formed with them as means for attaching.

As will be seen from the drawings, the door is placed in such position that its location, together with the peculiar form of the receptacle, makes any means for holding the door closed superfluous, as the handle projecting above it will hold it down. At the same time I prefer to construct the door so that it will stay half-open, as shown in Fig. 2, thereby preventing the contents from being spilled on the ground when the receptacle is being emptied. I do not, however, restrict myself to this construction and location of the door, as it is obvious that similar openings may be formed upon the sides for the purpose of emptying the contents of the receptacle.

To make a device of this kind practical, I have found by experience that utmost flexibility and elasticity of the frame is required, as otherwise it would seriously interfere with the free use of the lawn-mower. With my construction a sufficient freedom of the handle is preserved for taller or shorter persons, who necessarily hold the handle at different heights. At the same time the spring-frame forms a partial spring-support for the handle, which eases the work of using the lawn-mower to a considerable extent.

What I claim as my invention is—

1. An attachment to lawn-mowers, consisting of a receptacle made of a skeleton frame of spring-wire bent to form a contracted mouth, and said wire having projecting ends to engage parts of the mower to hold said frame thereto, and a fabric covering said frame, substantially as described.

2. An attachment to lawn-mowers, consisting of a flexible receptacle made of a skeleton spring-wire frame formed of the loops A and B, connected by transverse and diagonal bars, substantially as described, and with the projecting ends C and D, and of an outer covering of fabric, substantially as and for the purpose described.

In testimony whereof I affix my signature, in presence of two witnesses, this 25th day of August, 1888.

FRANK A. DELAND.

Witnesses:
J. PAUL MAYER,
P. M. HULBERT.